(12) United States Patent
Kim et al.

(10) Patent No.: US 12,529,512 B2
(45) Date of Patent: Jan. 20, 2026

(54) REFRIGERATOR AND HOME APPLIANCE

(71) Applicant: LG ELECTRONICS INC., Seoul (KR)

(72) Inventors: Kyoungjoung Kim, Seoul (KR); Misun Park, Seoul (KR); Bumsang Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 181 days.

(21) Appl. No.: 18/294,920

(22) PCT Filed: Aug. 5, 2022

(86) PCT No.: PCT/KR2022/011653
§ 371 (c)(1),
(2) Date: Feb. 2, 2024

(87) PCT Pub. No.: WO2023/014163
PCT Pub. Date: Feb. 9, 2023

(65) Prior Publication Data
US 2024/0426546 A1    Dec. 26, 2024

(30) Foreign Application Priority Data
Aug. 5, 2021 (KR) .................. 10-2021-0103346

(51) Int. Cl.
*F25D 27/00* (2006.01)
*F25D 23/02* (2006.01)

(52) U.S. Cl.
CPC ........... *F25D 27/00* (2013.01); *F25D 23/028* (2013.01)

(58) Field of Classification Search
CPC ......... F25D 11/00; F25D 23/028; F25D 27/00
See application file for complete search history.

(56) References Cited

U.S. PATENT DOCUMENTS

| | | | |
|---|---|---|---|
| 8,789,900 B2 | 7/2014 | Laible et al. | |
| 10,724,732 B2* | 7/2020 | Schenkl | F21V 23/04 |
| 2013/0119847 A1 | 5/2013 | Seo et al. | |
| 2020/0018538 A1* | 1/2020 | Pfaffinger, Jr. | A61L 9/205 |

(Continued)

FOREIGN PATENT DOCUMENTS

| | | |
|---|---|---|
| CN | 103250018 A | 8/2013 |
| JP | 2013-178054 A | 9/2013 |

(Continued)

OTHER PUBLICATIONS

Iinnovation Q+ NPL Search (Year: 2024).*

*Primary Examiner* — Anabel Ton
(74) *Attorney, Agent, or Firm* — Birch, Stewart, Kolasch & Birch, LLP

(57) ABSTRACT

A home appliance includes a cabinet having a space; and a door configured to open and close the space. The door includes a door body provided with an insulation material therein; a lighting device configured to emit light; a front plate disposed on a front surface of the door body and including a first portion and a second portion through which light emitted from the lighting device is transmittable and which is disposed outside the first portion. When light emitted from the lighting device passes through the second portion, the second portion of the front plate glows with a specific color by the light emitted from the lighting device.

20 Claims, 14 Drawing Sheets

(56) References Cited

U.S. PATENT DOCUMENTS

| | | | |
|---|---|---|---|
| 2020/0271373 A1* | 8/2020 | Choe | F25D 23/061 |
| 2024/0068740 A1* | 2/2024 | Lee | H05B 45/20 |

FOREIGN PATENT DOCUMENTS

| | | |
|---|---|---|
| KR | 10-2005-0095359 A | 9/2005 |
| KR | 10-2008-0076594 A | 8/2008 |
| KR | 10-2018-0067382 A | 6/2018 |
| WO | WO 2021/107345 A1 | 6/2021 |

* cited by examiner

FIG. 4
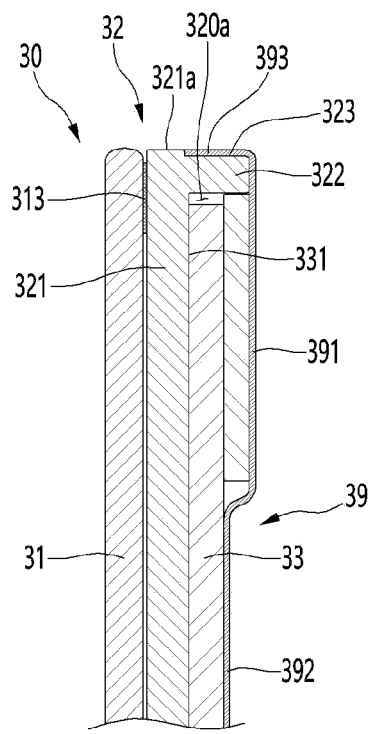
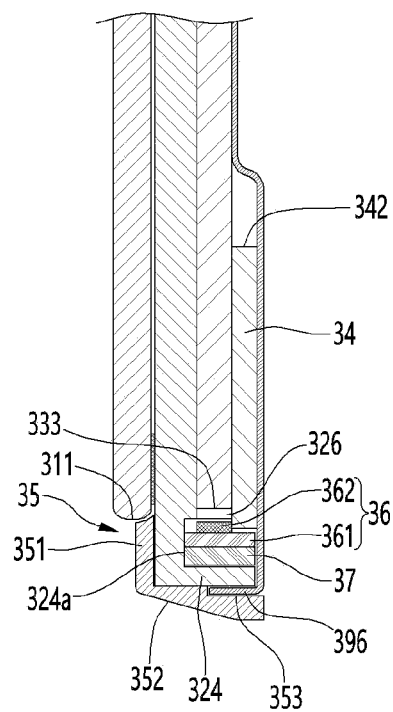

[Fig. 5]
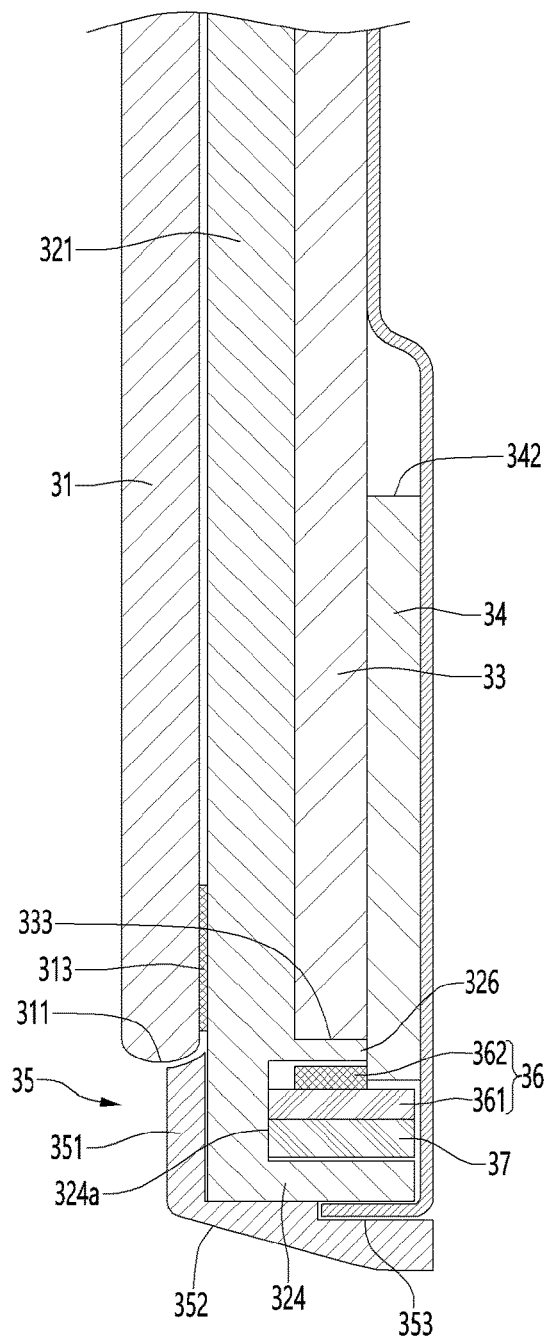
[Fig. 6]
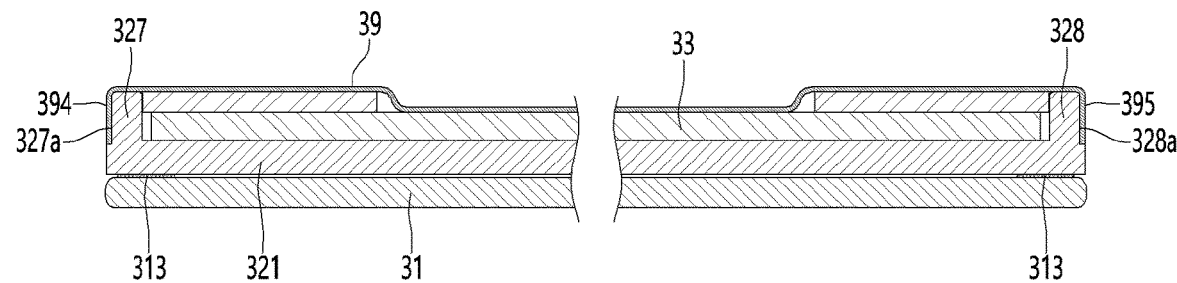

[Fig. 7]
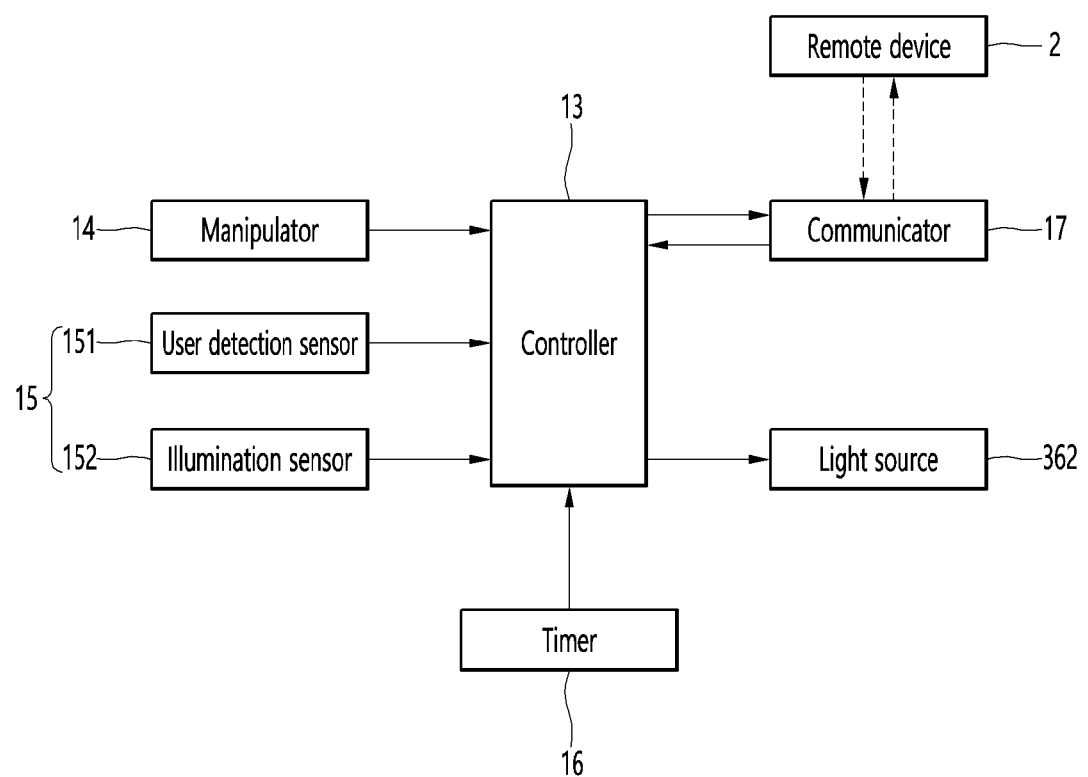

[Fig. 8]
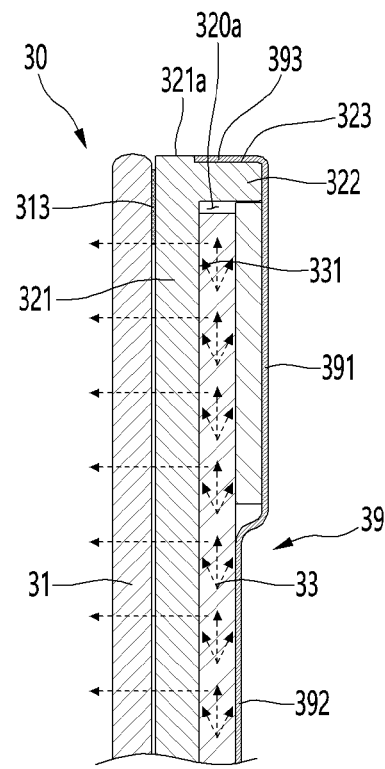
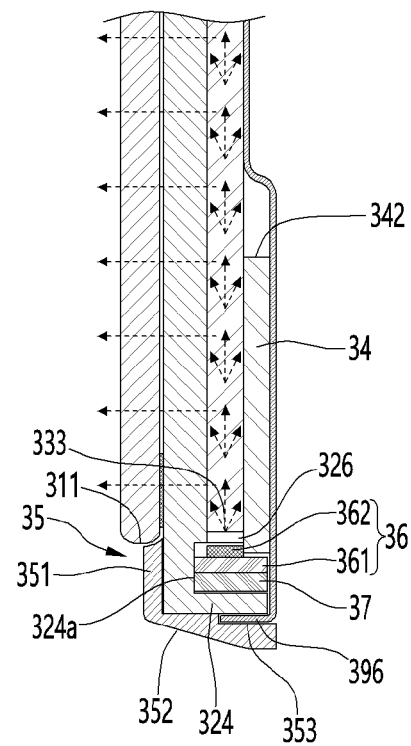

[Fig. 9]
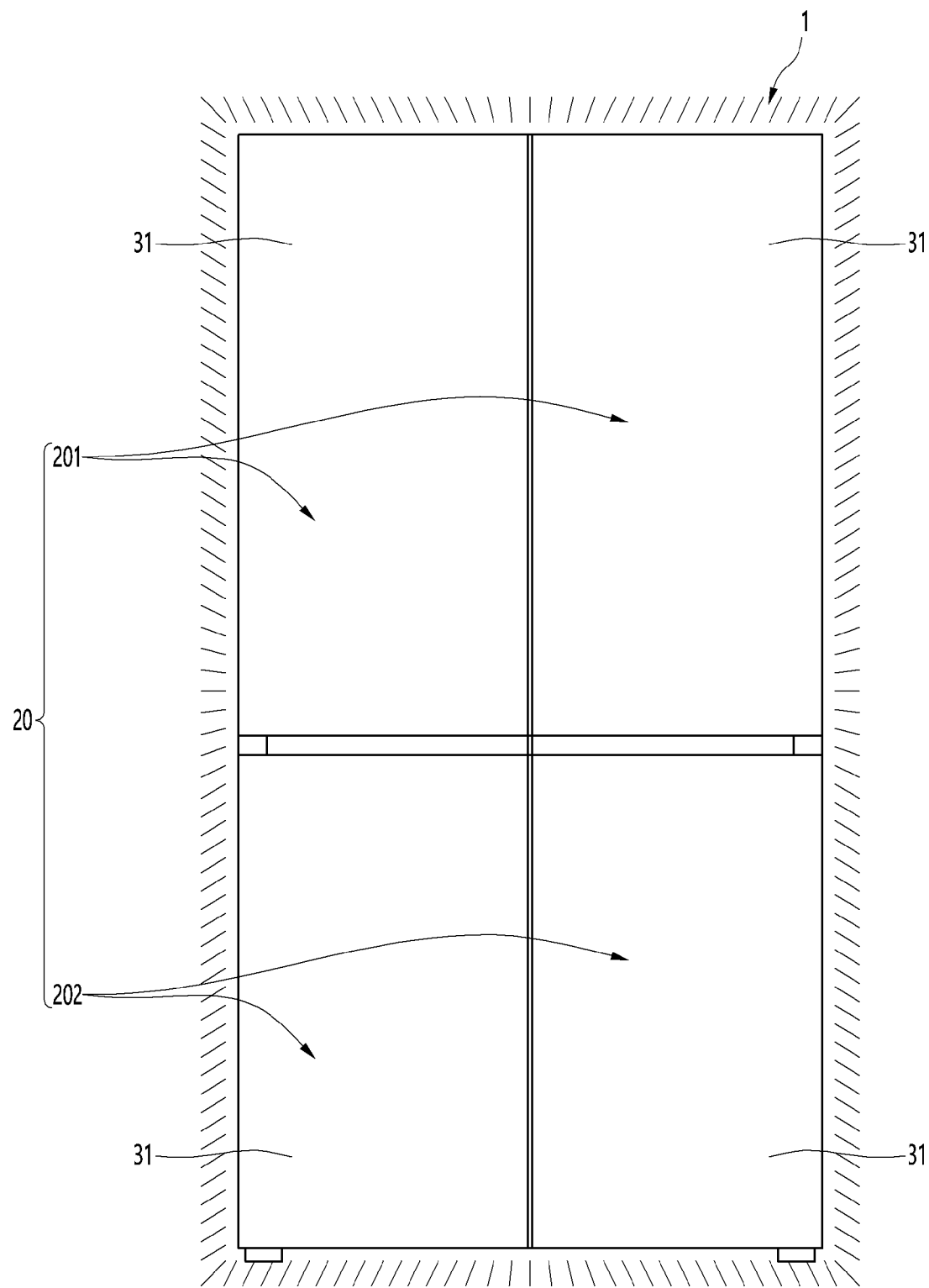

[Fig. 10]
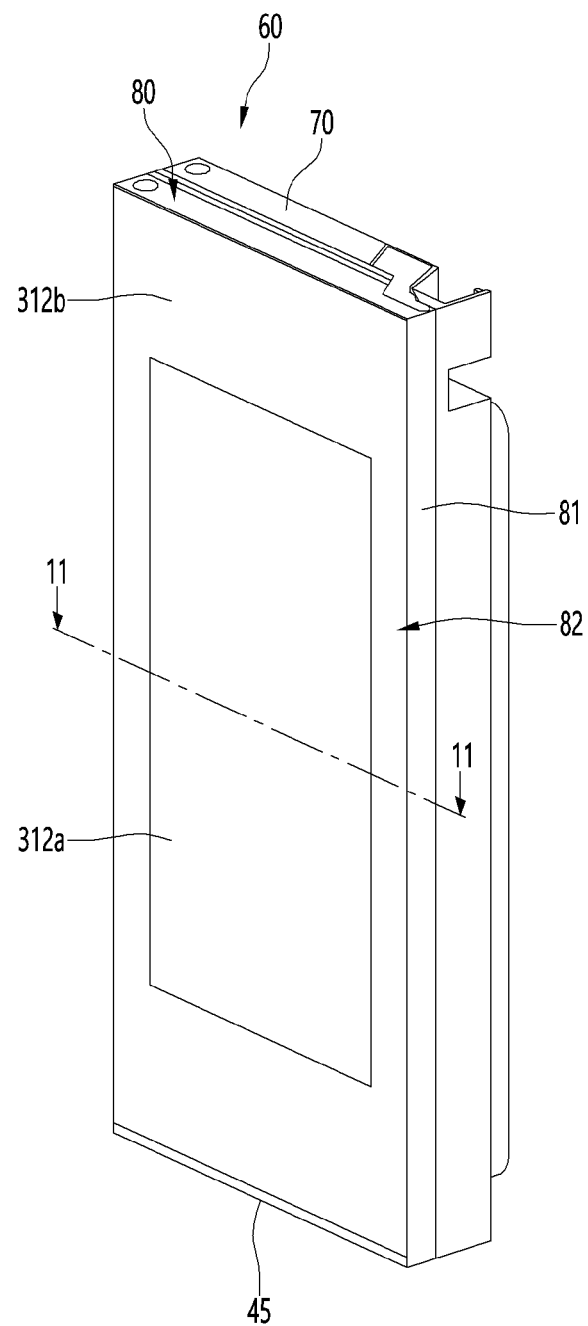

[Fig. 11]
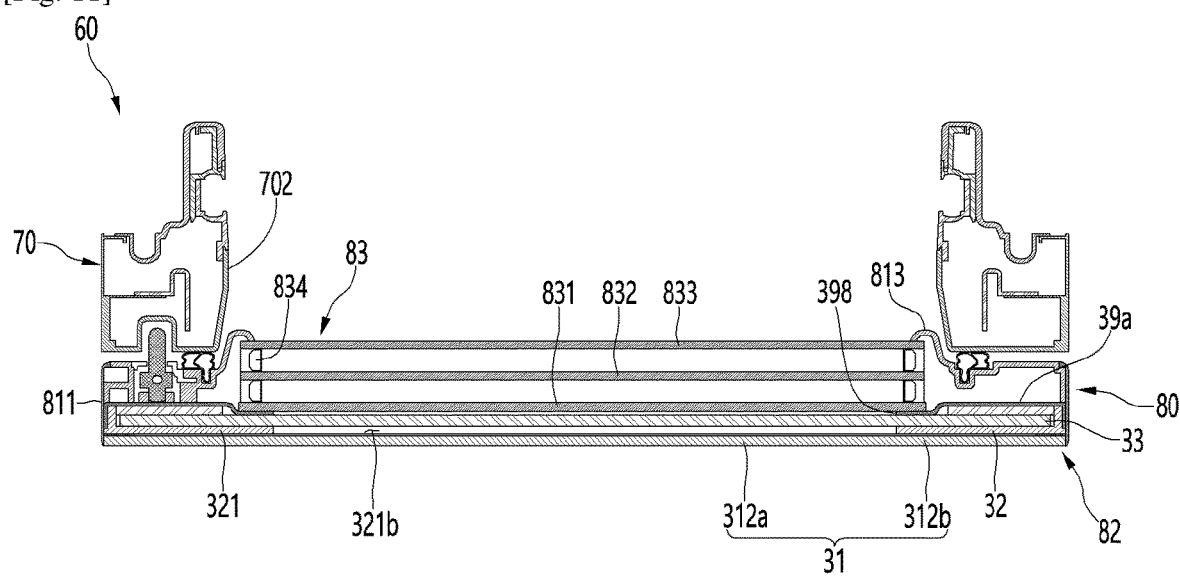

[Fig. 12]
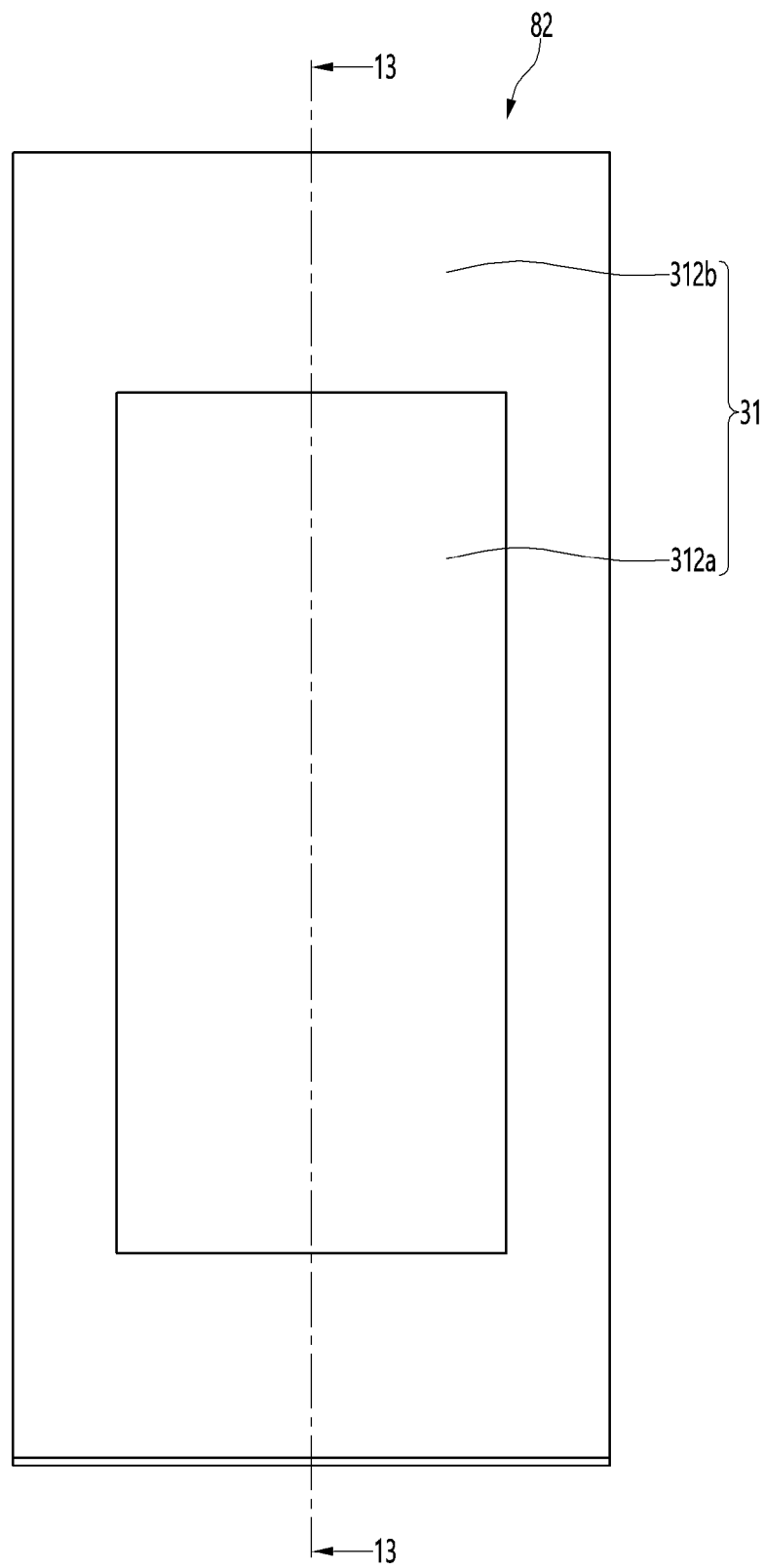

[Fig. 13]
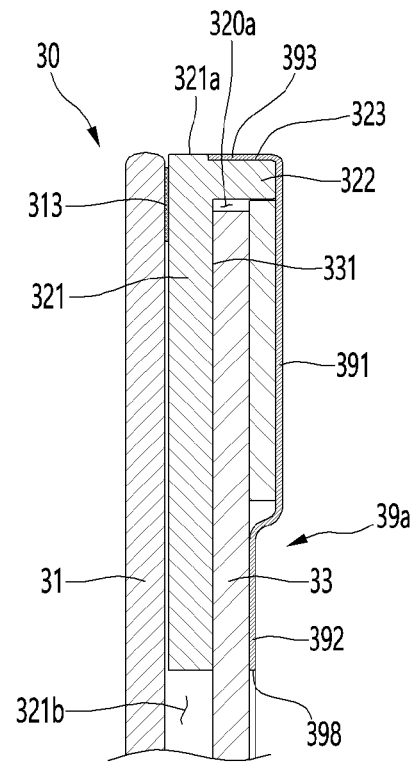
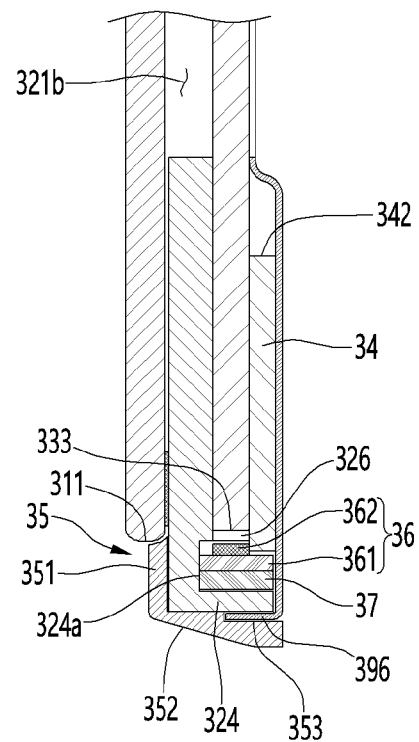

[Fig. 14]
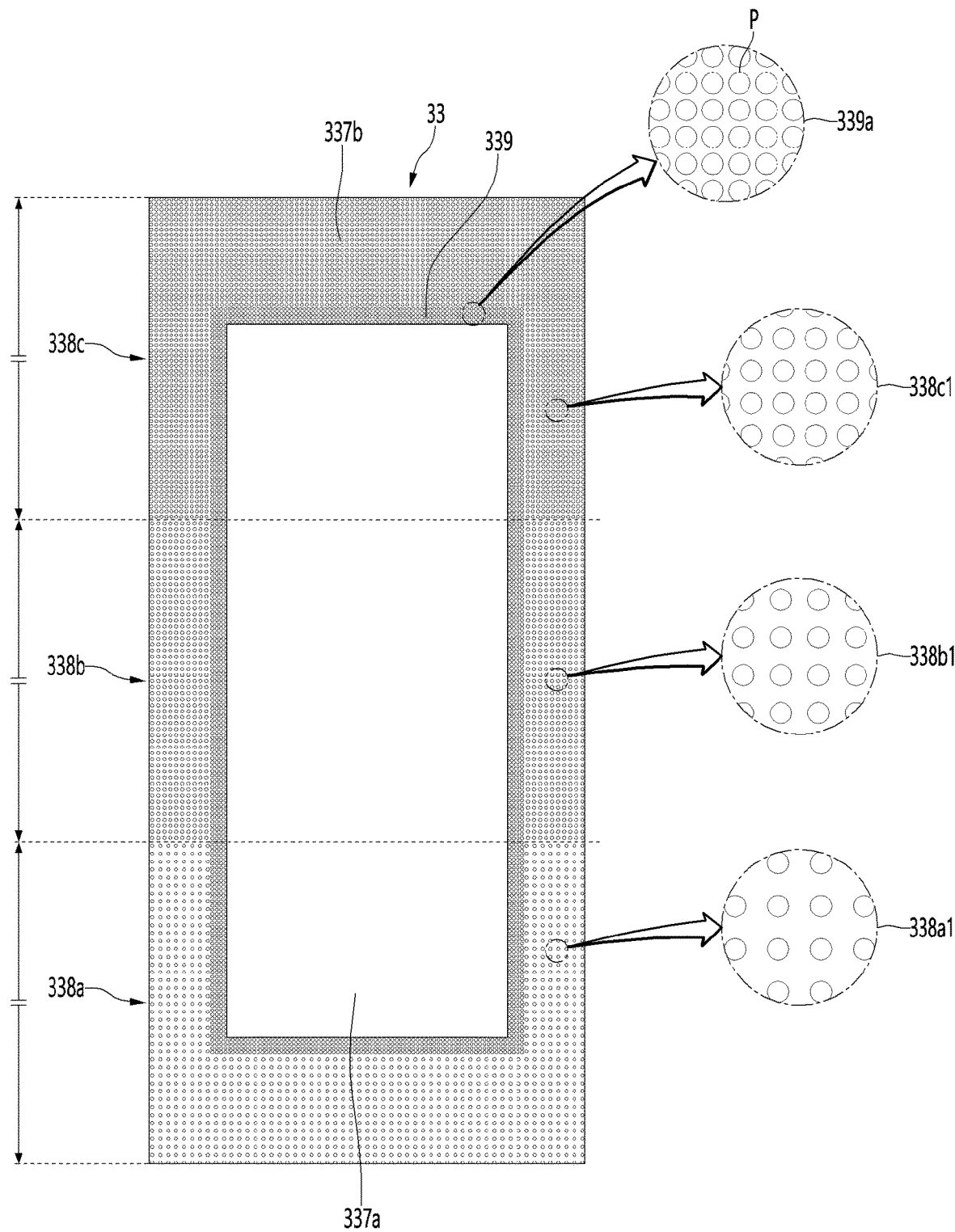

[Fig. 15]
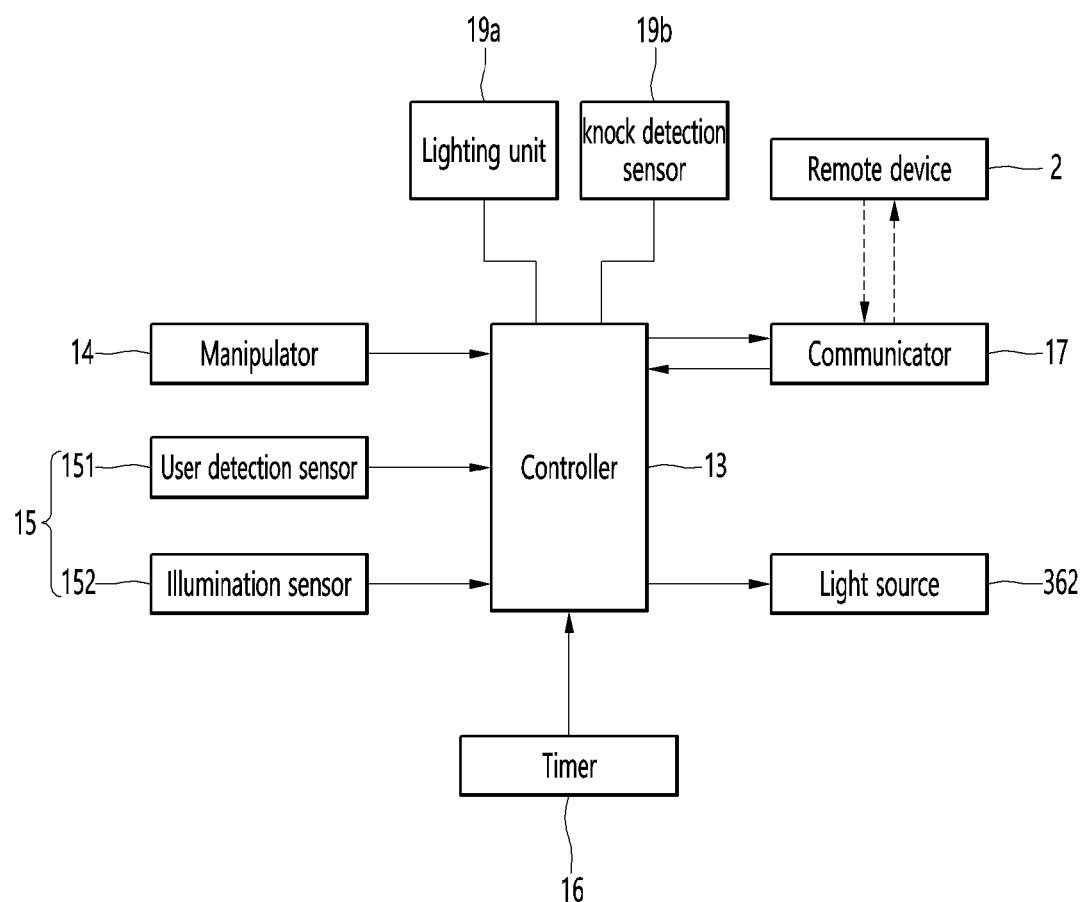

REFRIGERATOR AND HOME APPLIANCE

CROSS REFERENCE TO RELATED APPLICATIONS

This application is the National Phase of PCT International Application No. PCT/KR2022/011653, filed on Aug. 5, 2022, which claims priority under 35 U.S.C. 119(a) to Patent Application No. 10-2021-0103346, filed in the Republic of Korea on Aug. 5, 2021, all of which are hereby expressly incorporated by reference into the present application.

TECHNICAL FIELD

The present disclosure relates to a refrigerator and a home appliance.

BACKGROUND ART

In general, a refrigerator is a home appliance for storing foods in an internal storage space, which is shield by a refrigerator door, at a low temperature by low temperature air. The refrigerator cools the inside of the storage space using cool air generated by heat-exchanging with a refrigerant that circulates a cooling cycle to store the foods in an optimum state.

Such refrigerators tend to increase more and more in size and provide multi-functions due to the trends of change of dietary life and high quality, and accordingly, refrigerators provided with various structures and convenience devices in consideration of user convenience are brought to the market.

In order to harmonize with an environment in which the refrigerator is disposed or with surrounding furniture or home appliances, technologies structures for varying an outer appearance of a door front of the refrigerator are developed, and this trend is the same throughout the home appliance.

U.S. Pat. No. 8,789,900 discloses a structure in which a decoration panel forming an outer appearance is installed on a door front of a refrigerator, and here, the outer appearance of the door front is formed according to a user's preference by detachably configuring the decoration panel.

However, the refrigerator having this structure has a problem in that, when a user wants to change the outer appearance, the entire decoration panel needs to be removed and replaced, and it is not possible to use the decoration panel before replacement any longer.

To solve this limitation, Chinese Patent Application No. 103250018 discloses a refrigerator in which a reflective layer and a transparent panel are disposed on a door front and colored light emitting members are mounted on both side ends of the reflective layer to cause the transparent panel to glow with set color.

However, in such a structure, since the light emitting member is disposed further inside the panel defining the front surface of the door, shadows are generated at both ends of the door during an operation of the light emitting member to cause a poor outer appearance.

In addition, since the light emitting members are disposed at both the ends of the door, an amount of light at a central portion may be insufficient, and thus, brightness of the central portion may be low. Thus, there is a limitation in that it is not possible to secure a uniform amount of light over the entire front surface of the door.

In order to prevent this limitation from occurring, Korean Patent Publication No. 10-2018-0067382 discloses a refrigerator in which a light guide plate is provided inside a door, and an LED is provided below the light guide plate to irradiate light toward a front surface of the door.

However, in such a structure, a configuration for fixing the light guide plate is disposed along a circumference of the light guide plate to maintain the structure in which the light guide plate that is repeatedly opened and closed is fixed.

Thus, since light is transmitted only to a portion of the door except for a bezel, the entire front surface of the refrigerator door may not glow with uniform brightness.

In addition, when the LED is turned on for a long time, the light guide plate may be deformed. In this case, when the central portion of the light guide plate is in contact with a front panel, a locally dark mark may be formed when viewed from the outside, and thus, this phenomenon occurs more frequently when the size of the panel is large, resulting in user's dissatisfaction.

DISCLOSURE

Technical Problem

Embodiments provide a refrigerator, in which a front plate and a light guide plate are prevented from being in contact with each other, and a home appliance.

Embodiments also provide a refrigerator, in which an entire front plate defining a front surface of a door glows with a color that is set by a user, and a home appliance.

Embodiments also provide a refrigerator, in which a thickness of a panel assembly is minimized to prevent an insulation space of a door body from being reduced, and a home appliance.

Technical Solution

A home appliance comprises: a cabinet having a space; and a door configured to open and close the space.

The door may comprise: a door body provided with an insulation material therein. The door may further comprise a lighting device configured to emit light.

The door may further comprise a front plate disposed on a front surface of the door body.

The front plate may comprise a first portion and a second portion through which light emitted from the light device is transmittable and which is disposed outside the first portion.

When light emitted from the lighting device passes through the second portion, the second portion of the front plate glows with a specific color by the light emitted from the light device.

The lighting device may comprise a base and a light source installed on the base.

Light glowing at the second portion of the front plate has a color varying by varying in color of the light emitted from the lighting device.

The color of the light emitted from the light device varies by varying in one or more values of an R value, a G value, and a B value of the emitted light from the light device.

The home appliance may further comprise a light guide plate disposed behind the front plate.

In the light guide plate, a pattern configured to allow the light to be transmitted is disposed on an area facing the second portion.

The light guide plate may comprise: a first area disposed close to a boundary between the first portion and the second portion; and a second area disposed farther from the boundary than the first area.

An amount of light emitted by the pattern of the first area is greater than an amount of light emitted by the pattern of the second area.

The pattern of the first area is the same as the pattern of the second area. A density of the pattern of the first area is greater than a density of the pattern of the second area.

The pattern of the first area has a shape different from that of the pattern of the second area.

The light guide plate may comprise: a first section disposed close to the lighting device; and a second section disposed farther from the lighting device than the first section.

An amount of light emitted from the second section is greater than an amount of light emitted from the first section.

A density of the pattern of the second section is greater than a density of the pattern of the first section.

A distance between the patterns in the second section is less than a distance between the patterns in the first section.

The pattern of the second section has a shape different from that of the pattern of the first section.

The light guide plate may comprise: a first part corresponding to the first portion; and a second part which is disposed outside the first part and through which light emitted from the lighting device is transmittable.

The pattern is provided on only the second part so that the light emitted from the lighting device passes through the second part, but does not pass through the first part.

The home appliance may further comprise a diffusion member.

The diffusion member may include a front surface portion configured to diffuse the light passing through the light guide plate and disposed the front plate and the light guide plate.

The diffusion member may further include an extension portion extending along a circumference of the front surface portion and disposed to cover at least a portion of a circumference of the light guide plate.

The extension portion may comprise: an upper extension portion extending from an upper end of a rear surface of the front surface portion; and a lower extension portion extending from a lower end of the rear surface of the front surface portion.

The light guide plate is disposed between the upper extension portion and the lower extension portion.

The extension portion may further comprise a pair of side surface portions extending from both left and right ends of the front surface portion.

The light guide plate is disposed between the pair of side surface portions.

The diffusion member may further comprise: a light guide plate support disposed above the lower extension portion on the front surface portion to support a bottom surface of the light guide plate.

The diffusion member may further comprise a receiving groove disposed between the light guide support and the lower extension portion on the front surface portion to accommodate the lighting device.

The extension portion may comprise a pair of side surface portions extending from both left and right ends of the front surface portion.

The light guide plate is disposed between the pair of side surface portions.

The light guide plate is in contact with a rear surface of the front surface portion.

The front surface portion may comprise an opening defined in a position corresponding to the first portion.

The door may further comprise a back cover configured to cover a rear side of the light guide plate and comprising a bent portion that is in contact with the extension portion.

The home appliance may further comprise a lighting unit to emit light. The light emitted from the light unit is directed to the first portion.

A home appliance comprises: a cabinet having a space; and first and second doors configured to open and close the space.

The first door may comprise: a first lighting device configured to emit light; and a first front plate configured to define an outer appearance of a front surface of the first door and comprising a first portion and a second portion through which light emitted from the first lighting device is transmittable and which is disposed outside the first portion.

The second door may comprise: a second lighting device configured to emit light; a second front plate configured to define an outer appearance of a front surface of the second door and through which light emitted from the second lighting device is transmittable.

When the light emitted from the first lighting device passes through the second portion of the first front plate, the second portion of the first front plate glows with a first color by the light emitted from the first lighting device.

When the light emitted from the second lighting device passes through the second front plate, the second front plate glows with a second color by the light emitted from the second lighting device.

The first color of the light glowing at the second portion is the same as the second color of the light glowing at the first front plate.

The first color is different from the second color.

One or more of the first color and the second color vary by varying in color of the light emitted from one or more of the first lighting device and the second lighting device.

The color of the light varies by varying in one or more values of an R value, a G value, and a B value of the emitted light.

Advantageous Effects

The refrigerator and the home appliance according to the embodiment may have the following effects.

According to this embodiment, since the front surface portion of the diffusion member is entirely disposed between the front plate and the light guide plate, the light guide plate may be prevented from being in direct contact with the front plate even if the light guide plate is deformed by the heat. Therefore, the dark area such as the stains may be prevented from occurring on the front plate.

In this embodiment, since the diffusion member supports the light guide plate and fixes the position of the light guide plate, and the back cover is coupled to surround the portion of the diffusion member, the number of components of the panel assembly itself may be reduced to reduce the thickness of the panel assembly in the front and rear direction.

According to this embodiment, since the color of the front surface of the door is variously selected and changed without replacing the panel assembly, the user convenience may be improved, and there may be the advantage that the costs and work for replacing the panel assembly are unnecessary.

DESCRIPTION OF DRAWINGS

FIG. 4 is a cross-sectional view taken along line 4-4 of FIG. 3.

FIG. 5 is a cross-sectional view taken along line 5-5 of FIG. 3.

FIG. 6 is a cross-sectional view taken along line 6-6 of FIG. 3.

FIG. 7 is a block diagram illustrating a flow of a control signal of the refrigerator.

FIG. 8 is a vertical cross-sectional view illustrating an emission state of the panel assembly.

FIG. 9 a front view illustrating an outer appearance of a font surface of the refrigerator, in which the lighting device is turned on.

FIG. 10 is a perspective view of a refrigerator door according to another embodiment of the present disclosure.

FIG. 11 is a cross-sectional view taken along line 11-11 of FIG. 10.

FIG. 12 is a front view of a panel assembly according to another embodiment of the present disclosure.

FIG. 13 is a cross-sectional view taken along line 13-13 of FIG. 12.

FIG. 14 is a view illustrating a pattern portion of a light guide plate according to another embodiment of the present disclosure.

FIG. 15 is a block diagram illustrating a flow of a control signal in a refrigerator according to another embodiment of the present disclosure.

MODE FOR INVENTION

Hereinafter, detailed embodiments will be described in detail with reference to the accompanying drawings. However, the present disclosure is limited to the embodiments in which the spirit of the present disclosure is proposed, and other derivative ideas or other embodiments included in the scope of the present disclosure may be easily proposed by addition, changes, deletions, etc. of other elements.

Hereinafter, a refrigerator will be described as an example of a home appliance, but the description of the refrigerator according to the present disclosure may be applied to various home appliances including a cabinet having a space therein and a door configured to open and close the space. The home appliance may include, for example, an air conditioner, a clothes manager, a washing machine, a dryer, a dish washing machine, a cooking appliance, and the like.

Prior to a description, directions are defined. In an embodiment of the present disclosure, a direction toward a door is defined as a front direction with respect to a cabinet shown in FIGS. 1 and 2, a direction toward the cabinet with respect to the door is defined as a rear direction, a direction toward a bottom on which a refrigerator is installed is defined as a downward direction, and a direction away from the bottom is defined as an upward direction.

Figure 1:
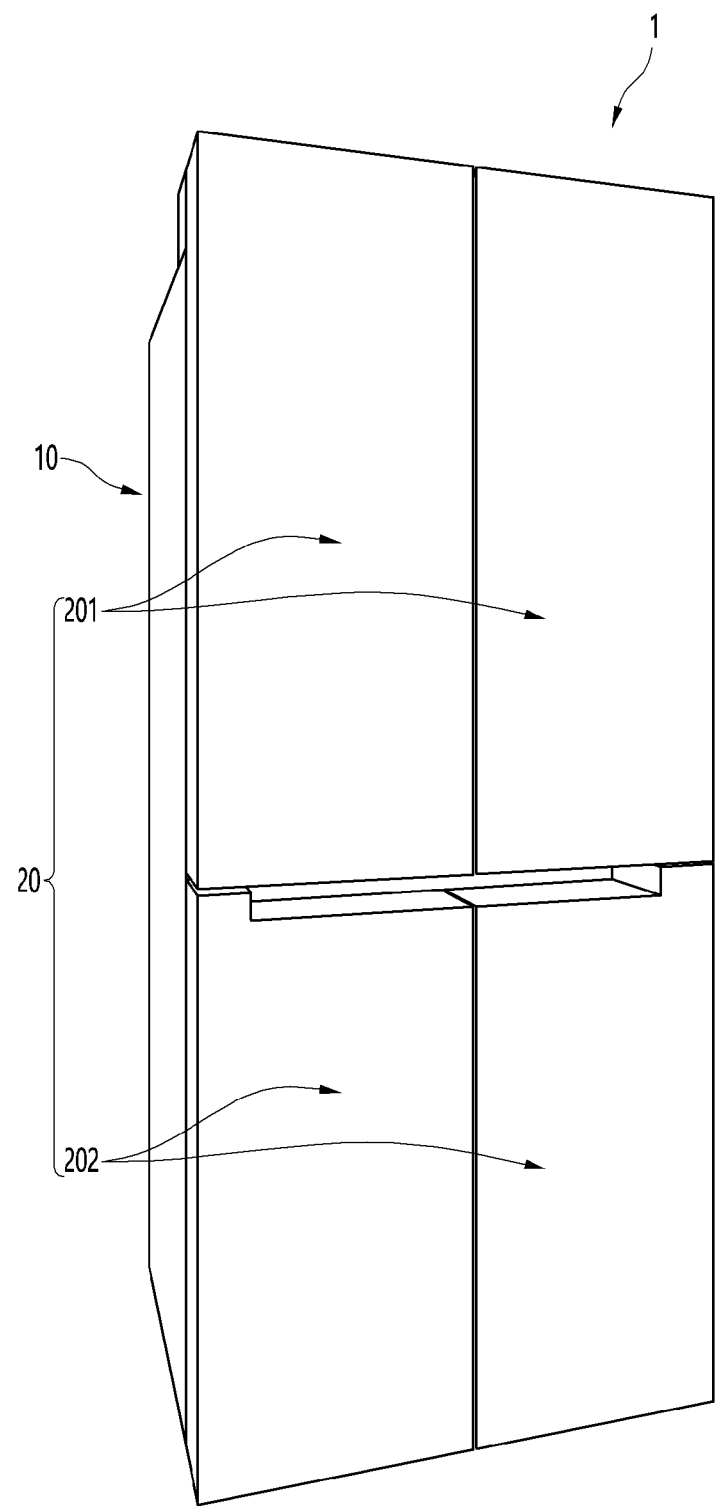
FIG. 1 is a front view of a refrigerator according to an embodiment of the present disclosure.

FIG. 1 is a perspective view of a refrigerator according to an embodiment.

Referring to FIGS. 1, a refrigerator 1 according to an embodiment of the present disclosure may include a cabinet 10 defining a storage space (or storage section) and a door 20 for opening and closing the storage space of the cabinet 10.

For example, the cabinet 10 may form the storage space partitioned in a vertical direction, a refrigerating compartment may be formed at an upper portion, and a freezing compartment may be formed at a lower portion. The refrigerating compartment may be referred to as an upper storage space, and the freezing compartment may be referred to as a lower storage space.

The door 20 may open and close each of the refrigerating compartment and the freezing compartment. For example, the door 20 may be rotatably mounted on the cabinet 10, and the refrigerating compartment and the freezing compartment may each be opened and closed by rotation. Alternatively, the door 20 may be configured to open and close the refrigerating compartment and/or the freezing compartment by being drawn in and out.

The door 20 may include a refrigerating compartment door 201 for opening and closing the refrigerating compartment and a freezing compartment door 202 for opening and closing the freezing compartment. The refrigerating compartment door 201 may be referred to as an upper door, and the freezing compartment door 202 may be referred to as a lower door.

The refrigerating compartment door 201 may include a pair of a left refrigerating compartment door and a right refrigerating compartment door that are arranged side by side. The left refrigerating compartment door and the right refrigerating compartment door may open and close the refrigerating compartment while being independently rotated. The left refrigerating compartment door and the right refrigerating compartment door may be disposed adjacent to each other and may have the same size.

The freezing compartment door 202 may include a pair of a left freezing compartment door and a right freezing compartment door that are arranged side by side. The left freezing compartment door and the right freezing compartment door may open and close the freezing compartment while being independently rotated. The left freezing compartment door and the right freezing compartment door may be disposed adjacent to each other and may have the same size.

Needless to say, although a refrigerator having a structure in which the refrigerating compartment is defined above the freezing compartment is described as an example in this embodiment, the present disclosure may be applied to all types of refrigerators equipped with a door without being limited to a type of a refrigerator.

an outer appearance of the front surface of the refrigerator 1 may be formed in the state in which the door 20 is closed and may form the out appearance of the refrigerator 1 viewed from the front in the state in which the refrigerator 1 is installed.

The door 20 may have a structure in which a front surface selectively emits light and may be configured to glow with set color or brightness. Thus, a user may change front color or brightness of the door 20 without separating or disassembling the door 20 and may change the overall outer appearance of the refrigerator 1.

Hereinafter, the structure of the door 20 will be described in detail with reference to drawings.

Figure 2:
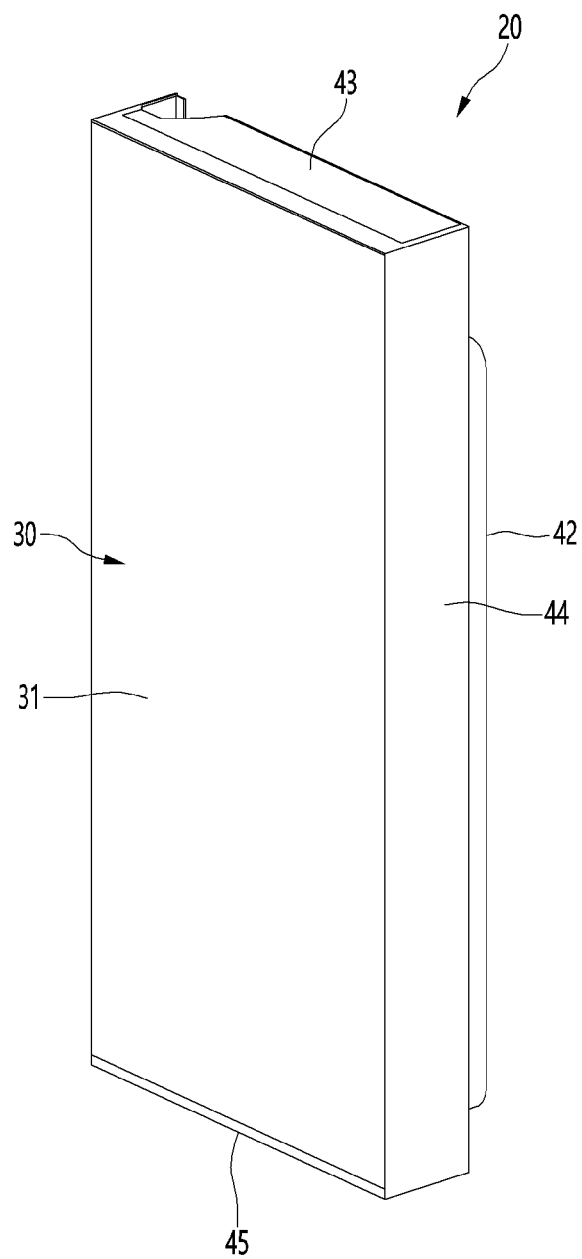
FIG. 2 is a perspective view of a refrigerator door according to an embodiment present disclosure.
Figure 3:
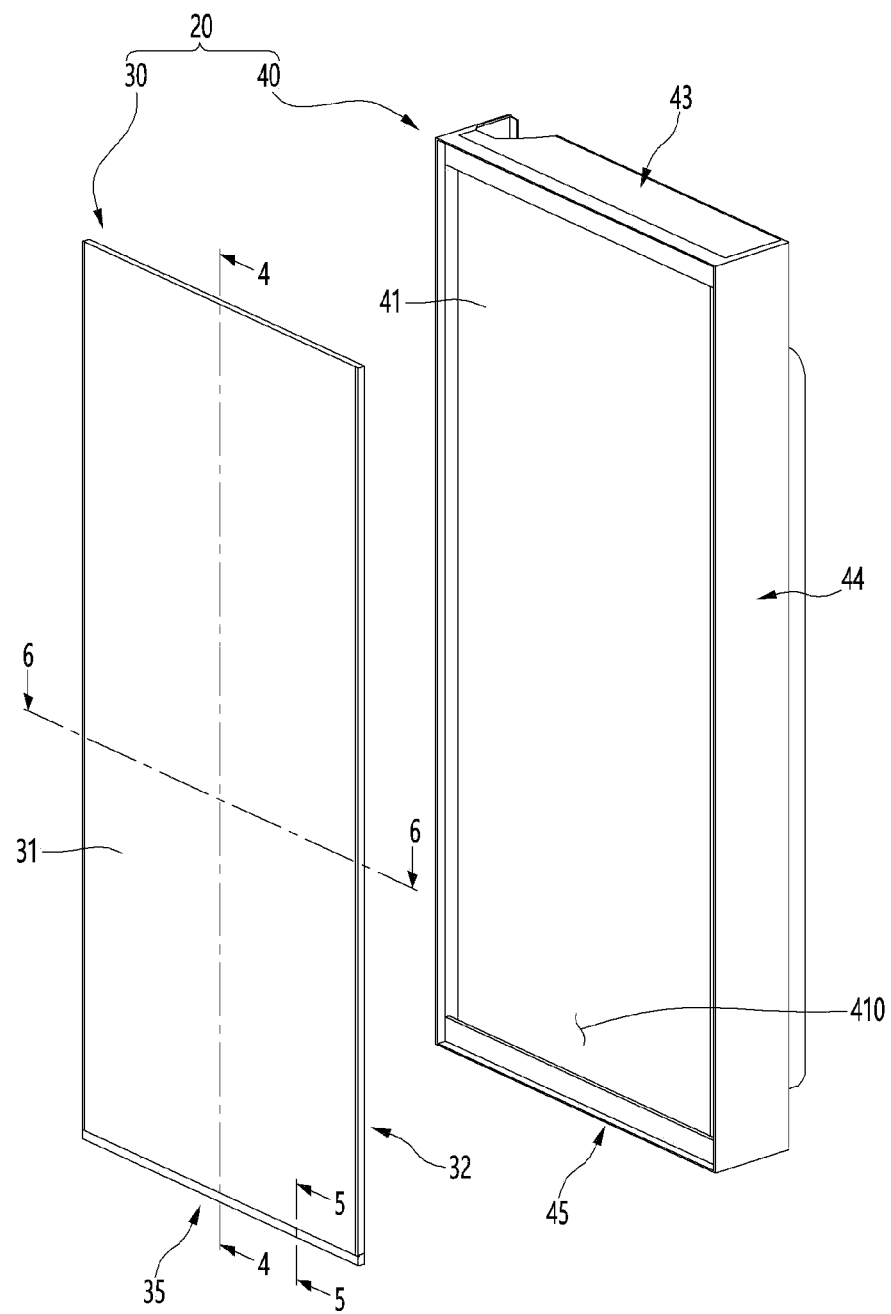
FIG. 3 is a view illustrating a state in which a panel assembly is separated from the refrigerator door.

FIG. 2 is a perspective view of a refrigerator door according to an embodiment present disclosure. FIG. 3 is a view illustrating a state in which a panel assembly is separated from the refrigerator door.

As illustrated in FIGS. 2 and 3, the door 20 may include a door body 40 forming the overall shape of the door 20, and a panel assembly 30 forming a front appearance of the door 20. That is, the door 20 may be configured in such a way that the panel assembly 30 is mounted on a front surface of the door body 40.

The door body 40 may include a body plate 41 defining a front surface and a door liner 42 defining a rear surface.

The body plate 41 may be formed of a metal material and may be formed in a plate shape having a size corresponding to the panel assembly 30. The door liner 42 may be formed of a plastic material and may form a bottom shape of the door 20.

The door body 40 may further include a side decoration 44 forming right and left side surfaces of the door body 40. The side decoration 44 may connect right and left side ends of the body plate 41 and right and left side ends of the door liner 42.

The door body 40 may include an upper cap decoration 43 and a lower cap decoration 45 that form top and bottom surfaces of the door body 40. The upper cap decoration 43 may be connected to an upper end of the side decoration 44, an upper end of the body plate 41, and an upper end of the door liner 42. The lower cap decoration 45 may be connected to a lower end of the side decoration 44, a lower end of the body plate 41, and a lower end of the door liner 42.

An outer appearance of the door body 40 may be formed by the body plate 41, the door liner 42, the side decoration 44, the upper cap decoration 43, and the lower cap decoration 45.

An insulator may be filled in an internal space of the door body 40, which is formed by coupling the body plate 41, the door liner 42, the side decoration 44, the upper cap decoration 43, and the lower cap decoration 45, and may provide an insulation structure to prevent heat from being transferred through the door 20. The insulator may be formed, for example, as a time elapses after a foaming liquid is filled. The door body 40 may be provided with an injection hole for filling the foaming liquid.

An opened forward panel receiving space 410 may be formed on a front surface of the door body 40. That is, front ends of the side decoration 44, the upper cap decoration 43, and the lower cap decoration 45 may protrude more forward than the front surface of the body plate 41.

A panel receiving space 410 that is opened forward may be defined at a front side of the door body 41. The panel receiving space 410 may be formed with a size corresponding to the size of the panel assembly 30 and the panel assembly 30 may be inserted into the panel receiving space 410. A circumference of the panel assembly 30 may be supported by a circumferential surface of the panel receiving space 410, that is, protruding portions of the side decoration 44, the upper cap decoration 43, and the lower cap decoration 45.

The panel assembly 30 may be formed in a plate shape as a whole and may be formed with a size corresponding to a front surface of the door body 40. Thus, when the panel assembly 30 is mounted on the front surface of the door body 40, the panel assembly 30 may shield the front surface of the door body 40 and may form an outer appearance of the front surface of the door 20. Since the panel assembly 30 may form the outer appearance of the front surface of the door 20, the panel assembly 30 may be referred to as a door panel, and since the panel assembly 30 may form the outer appearance of the front surface of the refrigerator 1, the panel assembly 30 may also be referred to as an exterior panel.

In the state in which the panel assembly 30 is mounted on the door body 40, a rear surface of the panel assembly 30 may be fixed in contact with the body plate 41. To fixedly mount the panel assembly 30, a lower end of the panel assembly 30 may be caught and restrained with a lower end of the lower cap decoration 45, and an upper end of the panel assembly 30 may be coupled to an upper end of a front surface of the upper cap decoration 43 to firmly couple the panel assembly 30 to the door body 40. The panel assembly 30 may be detachably mounted from the door body 40 for services and maintenance.

A front surface of the panel assembly 30 may be exposed forward in the state in which the panel assembly 30 is mounted on the door body 40, and the panel assembly 30 may substantially form the outer appearance of the front surface of the door 20. The panel assembly 30 may be configured to emit light from an entire front thereof and may be configured to glow with various colors.

To this end, a lighting device 36 may be provided inside the panel assembly 30. A wire (not shown) may be connected to the lighting device 36 in order to supply and control power. The wire (not shown) may be exposed outside the rear surface of the panel assembly 30, and a connector (not shown) may be provided on an end of the wire (not shown).

A structure connected to the connector of the wire to supply power to the lighting device 36 may be provided on a front surface of the door body 40.

Hereinafter, the structure of the panel assembly 30 will be described in more detail with reference to drawings.

FIG. 4 is a cross-sectional view taken along line 4-4 of FIG. 3, and FIG. 5 is a cross-sectional view taken along line 5-5 of FIG. 3. FIG. 6 is a cutaway cross-sectional view taken along line 6-6 of FIG. 3.

Referring to FIGS. 3 to 6, the panel assembly 30 may include a front plate 31 forming an outer appearance of the front surface, the lighting device 36 for emitting light to cause the front plate 31 to glow, a light guide plate 33 for guiding the light emitted from the lighting device 36, and a diffusion member 32 allowing the light guide plate 33 to be spaced apart from the front plate 31 and diffusing the light. The diffusion member 32 may also be referred to as a support member in terms of supporting the light guide plate 33.

The lighting device 36 and the light guide plate 33 may be mounted or supported on the diffusion member 32.

The panel assembly 30 may further include a back cover 39 defining a rear surface of the panel assembly 30.

The front plate 31 may be formed in a rectangular plate shape and may be formed of a material that transmits light therethrough. For example, the front plate 31 may be formed of a glass material such as blue glass, white glass, and vapor deposition glass or may be formed of other materials for transmitting light therethrough, such as ABS, PMMA, or PC. The front plate 31 may be referred to as a transparent plate or an out plate.

The front plate 31 may be formed to be transparent to allow light reflected by the light guide plate 33 to be transmitted. In this case, transparency may be defined to a degree to which light reflected from the light guide plate is transmitted and irradiated to the outside.

The front plate 31 may be formed to have color and may be formed to represent different colors depending on an operation or on and off states of the lighting device 36. For example, a specific design or pattern may be printed on the front plate 31 to have specific color. A film with a specific design or pattern printed thereon may be added to the front plate 31, surface treatment such as imprinting, etching, and glass printing may be performed on the front plate 31, or a coating or deposition layer having specific color and texture may be formed to form an outer appearance of the front plate 31.

The front plate 31 may be configured to transmit light emitted from the lighting device 36 but components behind the front plate 31 may not be seen therethrough. That is, in the state in which the lighting device 36 is turned off, components inside the panel assembly 30 may be prevented from being seen to the outside through the front plate 31 due to the color of the front plate 31.

In this case, a color layer 311 having color may be formed on the front plate 31. In an off state, the color layer 311 may be formed to have at least color having brightness equal to or greater than 0 other than black. That is, in a state in which the refrigerator 1 is installed, the front surface of the refrigerator 1 may be displayed in a color other than black, and the front color of the refrigerator may be changed according to an operation of the lighting device 36.

In the panel assembly 30, the entire front surface of the front plate 31 may be exposed to the outside.

A vertical length of the diffusion member 32 may be longer than that of the front plate 31. A left and right length of the diffusion member 32 may be the same as or substantially similar to that of the front plate 31.

A top surface 321a of the diffusion member 32 may be disposed at the same height as the top surface of the front plate 31. Thus, the light diffused by the diffusion member 32 may be transmitted through the front plate 31 as a whole, and thus, the entire front surface of the front plate 31 may glow.

A rear surface of the front plate 31 may be coupled to a front surface of the diffusion member 32. Thus, in the state in which the front plate 31 is mounted on the diffusion member 32, a separate component is not present at the circumference of the front plate 31, and the front plate 31 may form the outer appearance of the front surface of the panel assembly 30.

The light guide plate 33 may be positioned at a rear spaced apart from the front plate 31 by the diffusion member 32 and may be configured to guide light emitted from the lighting device 36 disposed at the upper end of the light guide plate 33 forward.

For example, the light guide plate 33 may be formed of transparent acrylic, plastic, or a transparent polymer material. The light guide plate 33 may have a diffusing agent added thereto for diffusing light entrance on the light guide plate 33 or a pattern for diffusing light may be further formed on the light guide plate 33. Thus, light may be transferred to the front plate 31 by the light guide plate 33, and in this case, a pattern of the light guide plate 33 may be set to cause the entire front surface of the front plate 31 to glow with uniform brightness.

The light guide plate 33 may be entirely formed in a rectangular plate shape and may be formed with a somewhat smaller size than that of the front plate 31. That is, a left and right width of the light guide plate 33 may be less than that of the front plate 31, and a vertical length of the light guide plate 33 may be less than that of the front plate 31.

A load of the light guide plate 33 may be supported by the diffusion member 32 and may be pressed toward the diffusion member 32 by the back cover 39.

The diffusion member 32 may be disposed between the front plate 31 and the light guide plate 33. The diffusion member 32 may allow the light guide plate 33 to be maintained at a predetermined distance from the front plate 31 and may diffuse light emitted from the light emission surface of the light guide plate 33.

The front surface of the diffusion member 32 may support the front plate 31 and opposite side surfaces of the diffusion member 32 may restrain both ends of the light guide plate 33. The front surface of the diffusion member 32 may have a size greater than or equal to that of the light guide plate 33, and in the state in which the light guide plate 33 is mounted, the rear surface of the diffusion member 32 and the light guide plate 33 may be maintained in the state of being in surface contact with each other.

The diffusion member 32 may include a plate-shaped front surface portion 321, on which the front plate 31 is mounted, and an extension portion extending from a circumference of the front surface portion 321. The front surface portion 321 and the extension portion may define an accommodation space 320a in which the light guide plate 33 is disposed.

The extension portion is disposed to cover the circumference of the light guide plate 33. The circumference of the light guide plate 33 may include, for example, a top surface, a bottom surface, and both side surfaces.

For example, the extension portion may include an upper extension portion 322 extending from an upper end of a rear surface of the front surface portion 321, a lower extension portion 324 extending from a lower end of the rear surface of the front surface portion 321, and a pair of side surface portions 327 and 328 extending from both left and right ends of the front surface portion 321.

The upper extension portion 322, the lower extension portion 324, and the pair of side surface portions 327 and 328 may define the accommodation space 320a in which the light guide plate 33 is disposed. Thus, the diffusion member 32 not only serves to diffuse light, but also serves to accommodate and support the light guide plate 33.

The front surface portion 321 may be formed like a plate corresponding to the front plate 31, and a front surface of the light guide plate 33 may be in close contact with a rear surface of the front surface portion 321.

A vertical length of the front surface portion 321 may be less than that of the light guide plate 33. A left and right width of the front surface portion 321 may be greater than that of the light guide plate 33.

Thus, according to this embodiment, since the front surface portion 321 of the diffusion member 32 is entirely disposed between the front plate 31 and the light guide plate 33, even if the light guide plate 33 is deformed by the heat, the light guide plate 33 may be prevented from being in direct contact with the front plate 31. Thus, it is possible to prevent a dark area such as stains from occurring on the front plate 31.

The front surface portion 321 and the rear surface of the front plate 31 may be coupled to each other by an adhesion portion 313. The adhesion portion 313 may include, for example, a sealant or a double-sided tape.

The side surface portions 327 and 328 may extend backward from right and left side ends of the front surface portion 321 and may be formed to restrain right and left side ends of the light guide plate 33. The side surface portions 327 and 328 may be spaced apart from at least one of both left and right side surfaces of the light guide plate 33. When the light guide plate 33 moves to left and right sides, the side surface portions 327 and 328 may be in contact with at least one surface of both the left and right side surfaces to restrict the at least one surface. When it is considered that the light guide plate 33 is expanded by heat, the side surface portions 327 and 328 may be spaced apart from at least one of the left and right side surfaces of the light guide plate 33.

Each of the upper extension portion 322 and the lower extension portion 324 extends backward from the front surface portion 321, and a length of each of the upper extension portion 322 and the lower extension portion 324 is greater than a thickness of the light guide plate 33.

The diffusion member 32 may be made of a material for transmitting light therethrough and may be entirely formed by injection or extrusion as a single component.

The diffusion member 32 may be made of a transparent or translucent material as a whole. The diffusion member 32 itself may be provided to have a color. Thus, when viewed from the front of the panel assembly 30, a color, texture, or shape of the front surface of the panel assembly 30 may be determined by the diffusion member 32.

The diffusion member 32 may further include a light guide plate support 326 supporting a bottom surface 333 of the light guide plate 33. The light guide plate support 326 may extend backward from the rear surface of the front surface portion 321 and may be disposed above the lower extension portion 324 to be spaced apart from the lower extension portion 324.

To stably support the load of the light guide plate 33, the diffusion member 32 may include a plurality of light guide plate supports 326. The plurality of light guide plate supports 326 may be disposed to be spaced apart from each other in the horizontal direction.

The lighting device 36 may be accommodated in the diffusion member 32. The diffusion member 32 may include a receiving groove 324a (or receiving portion) that receives a portion of the lighting device 36.

The receiving groove 324a may be defined as a rear portion of the front surface portion 321 is recessed forward. Thus, the portion in which the receiving groove 324a is defined in the front surface portion 321 may be thinner than other portions.

The receiving groove 324a may be defined between the light guide plate support 326 and the lower extension portion 324. Thus, when the lighting device 36 is received in the receiving groove 324a, the lighting device 36 may be disposed below the light guide plate support 326.

The lighting device 36 may include a substrate 361 and the light source 362. The substrate 361 may be provided in a plate shape to be elongated in the left and right direction.

The plurality of light sources 362 may be arranged at a constant interval on the substrate 361. The light source 362 may be disposed to radiate light toward the bottom surface 333 of the light guide plate 33. That is, the bottom surface 333 of the light guide plate 33 is a light entrance surface, and the front surface 331 of the light guide plate 33 is the light emission surface.

The light source 362 may be disposed to emit light toward the lower end of the light guide plate 33. At least one of the left and right ends of the substrate 361 may be restricted from moving in the left and right direction by the side surface portions 327 and 328 of the diffusion member 32.

The light source 362 may be disposed vertically below the bottom surface 333 of the light guide plate 33, i.e., may be disposed to face the bottom surface 333 of the light guide plate 33.

The light source 362 may be provided as, for example, an LED. The light source 362 may be configured as an RGB LED capable of irradiating light with various colors according to a control of the controller 13, which will be described later. That is, the light source 362 may emit light with various colors under control of the controller 13 that will be described later, and thus the front plate 31 may glow with color set by the controller 13. A color of the front appearance of the refrigerator 1 may be determined according to color of the front plate 31.

The light source 362 may include an LED for emitting light with specific color other than the RGB LED and may include a combination of a plurality of LEDs for emitting light with different colors. For example, the plurality of light sources 362 may include red, green, and blue LEDs and may sequentially and repeatedly arranged. Under control of the controller 13, operations of the light sources 362 may be combined to cause the front plate 31 to glow with desired color.

An interval between the light sources 362 may be smaller than the right and left width of the light guide plate support 326, and thus the light guide plate support 326 may be disposed between the light sources 362. Thus, the light emitted from the light source 362 may pass between two adjacent light guide plate supports 326 and be irradiated to the bottom surface 333 of the light guide plate 33.

The panel assembly 30 may further include a substrate supporter 37 seated on the lower extension portion 324 of the diffusion member 32.

The substrate supporter 37 may support the substrate 361 while being seated on the lower extension portion 324. A substrate supporter 37 may dissipate heat generated by the lighting device 36 by thermal conduction.

The substrate supporter 37 may be made of, for example, a metal material. For example, the substrate supporter 37 may be made of an aluminum material having high thermal conductivity. The substrate supporter 37 may be extruded with a metal material to have the same cross-sectional shape in the longitudinal direction.

A portion of the substrate supporter 37 may be received in the receiving groove 324a. The substrate supporter 37 may be in contact with the back cover 39 while the back cover 39 is assembled. Thus, the heat generated by the lighting device 36 may be transferred toward the back cover 39 through the substrate supporter 37 and may be dissipated through the back cover 39.

The panel assembly 30 may further include a rear supporter 34 supporting the rear surface of the light guide plate 33. The rear supporter 34 may be provided in a plate shape and may be attached to the rear surface of the light guide plate 33 by an adhesive.

The rear supporter 34 may be made of an opaque material through which light transmission is restricted. The rear supporter 34 may be accommodated in the accommodation space 320a defined by the diffusion member 32. The upper extension portion 322 may cover an upper side of the rear supporter 34, and the side portions 327 and 328 may cover both the side surfaces of the rear supporter 34.

A bottom surface of the rear supporter 34 may be disposed above the substrate 361. For example, a bottom surface of the rear supporter 34 may be seated on a top surface of the substrate 361.

In this case, the upward movement of the substrate 361 may be restricted by the rear supporter 34. Since the bottom surface 333 of the light guide plate 33 is seated on the top surface of the light guide plate support 226, a set interval may be maintained between the bottom surface of the light guide plate 33 and the light source 362.

As described above, the lighting device 36 may be maintained in the fixed state, and a distance between the light guide plate 33 and the light source 362 may also be maintained at a set distance, and thus, the light irradiated from the light source 362 may be incident into the light guide plate 33 at a designed angle. Thus, the light irradiated from the light source 362 may be effectively irradiated toward the light guide plate 33, and the light reflected through the light guide plate 33 may allow the front plate 31 to glow with set brightness.

In another aspect, the rear supporter 34 may be seated on the light guide plate support 326.

The rear supporter 34 may include an opening 342 through which a portion of the back cover 39 passes.

The back cover 39 may include a cover body 391 and a bent portion extending from an edge of the cover body 391 in the horizontal direction.

The cover body 391 may be in contact with the rear surface of the rear supporter 34. The cover body 391 may be attached to the rear supporter 34 by the adhesive or may be coupled to the rear supporter 34 by a coupling member such as a screw.

The bent portion may extend forward from the edge of the cover body 391 and may include an upper bent portion 393, a lower bent portion 396, and a pair of side bent portions 394 and 395. The bent portion may be in contact with the diffusion member 32. For example, the bent portion may adhere to the extension portion of the diffusion member 32 by the adhesive.

For example, the upper bent portion 393 may be seated in an upper seating groove 323 having a recessed shape defined in the upper extension portion 322 of the diffusion member 32.

The lower bent portion 396 may be in contact with a bottom surface of the lower extension portion 324 of the diffusion member 32. The side bent portions 394 and 395 may be seated in the recessed side seating grooves 327a and 328b defined in the side extension portions 327 and 328.

In this embodiment, since the diffusion member 32 supports the light guide plate 33 and fixes a position of the light guide plate 33, and the back cover 39 is coupled to surround a portion of the diffusion member 32, the number of components of the panel assembly 30 itself may be reduced to reduce a thickness of the panel assembly in the front and rear direction.

The cover body 391 may further include a pressing portion 392 bent toward the light guide plate 33. The pressing portion 392 may pass through the opening 342 of the rear supporter 34 so as to be in contact with the rear surface of the light guide plate 33.

In this embodiment, the cover body 391 may press the rear supporter 34 toward the rear surface side of the light guide plate 33 while being in contact with the rear surface of the rear supporter 34, and the pressing portion 392 may directly press the light guide plate 33.

The receiving groove 324a may be defined at a position equal to or lower than that of the bottom surface 311 of the front plate 31. That is, a portion of the front surface portion 321 may extend further downward than the bottom surface 311 of the front plate 31.

The diffusion member 32 may diffuse the light irradiated from the light emission surface of the light guide plate 33. Since a portion of the diffusion member 32 is disposed lower than the bottom surface 311 of the front plate 31, there is a possibility that the light passing through the diffusion member 32 is directly irradiated to the outside without passing through the front plate 31. To prevent this phenomenon, the panel assembly 30 according to this embodiment may further include a lower trim 35.

The lower trim 35 may be coupled to the diffusion member 32 by a coupling means such as an adhesion portion or a hook.

The lower trim 35 may include a first portion 351 extending in the vertical direction and a second portion 352 extending in the horizontal direction from a lower end of the first portion 351.

At least the first portion 351 may be provided to be transparent or translucent and, as necessary, may be provided with a specific color.

The first portion 351 may cover a portion of the diffusion member 32 extending downward from the bottom surface 311 of the front plate 31. For example, the first portion 351 may be disposed to face the receiving groove 324a in front of the receiving groove 324a in the diffusion member 32.

The second portion 352 may support the lower extension portion 324. The second part 352 may include a seating groove 353 for seating the lower bent portion 396 of the back cover 39.

FIG. 7 is a block diagram illustrating a flow of a control signal of the refrigerator. FIG. 8 is a vertical cross-sectional view illustrating an emission state of the panel assembly. FIG. 9 is a front view illustrating an outer appearance of a font surface of the refrigerator, in which the lighting device is turned on.

As illustrated in the drawings, in the refrigerator 1 according to an embodiment of the present disclosure, a front surface of the door 20 may glow via an operation of the lighting device 36.

The front surface of the door 20 may be turned on or off and may glow with any one of a plurality of colors under control of the controller 13.

The operation of the lighting device 36 may be performed by manipulation of a manipulator 14 of a user. The manipulator 14 may be disposed at one side of the refrigerator 1, and for example, may be disposed at one side of the cabinet 10. Needless to say, as necessary, the manipulator 14 may be included in the door 20 or manipulation may be input by touching and manipulating the front plate 31. That is, the user may directly manipulate the manipulator 14 to set an operation of the lighting device 36 and may turn on or off the lighting device 36.

The user may set an operation state of the lighting device 36, such as an operation time and an operation condition of the lighting device 36 and emission color of the light source 362 through manipulation of the manipulator 14. As necessary, the manipulator 14 may be configured as a display for information display and manipulation.

The lighting device 36 may also be manipulated in operation and set in operation condition through a remote device 2 spaced apart from the refrigerator 1. The refrigerator 1 may communicate with the remote device 2 through a communicator 17 connected to a controller 13, and the user may control an operation of the lighting device 36 through the remote device 2.

The communicator 17 may communicate with the remote device 2 using various methods. The communicator 17 may communicate with the remote device 2 using various methods. The remote device 2 may be various devices that are capable of communicating, such as a dedicated terminal, a mobile phone, a tablet, a portable PC, a desktop PC, a remote control, or a Bluetooth speaker.

The user may manipulate and set the operation state of the lighting device 36, such as an operation time and an operation condition of the lighting device 36 and emission color through manipulation of the remote device 2. For example, the lighting device 36 may be simply manipulated and set through an application or a dedicated program installed in a portable phone of the user.

The lighting device 36 may also be operated by a sensor. The sensor may be, for example, a user detection sensor 151 for detecting proximity of the user. For example, the user detection sensor 151 may use various devices for detecting user approaching near the refrigerator, such as an infrared sensor, an ultrasonic sensor, or a laser sensor.

The sensors 15 may be disposed at various positions for detecting proximity of the user, such as one side of the cabinet 10 or one side of the door 20, and may be disposed at various positions for detecting proximity of the user. A plurality of sensors may be disposed at different positions.

Thus, when the user approaches the refrigerator 1 by a set distance for use of the refrigerator 1, the user detection sensor 151 may detect this and may transfer a signal to the controller 13 to turn on the lighting device 36. When the user moves away from the refrigerator 1, the user detection sensor 151 may detect this and may transfer a signal to the controller 13 to turn off the lighting device 35.

When the user detection sensor 151 detects that the user is close to the refrigerator 1 within a reference distance, the lighting device 36 may be turned off or the brightness may be gradually dimmed to prevent glare of the user. When the user moves away from the refrigerator 1 again, the lighting device 35 may be turned on again or may return to an original brightness.

The sensor may be an illumination sensor 152. The illumination sensor 152 may detect illumination of an indoor space and may be disposed at the same position as a position at which the user detection sensor 151 is disposed.

The lighting device 36 may be operated according to a detected illumination of the illumination sensor 152. For example, when the detected illumination of the illumination sensor 152 is equal to or less than a set illumination and the lighting device 36 is dimmed, the controller 13 may turn on the lighting device 36, and when the detected illumination of the illumination sensor 152 is equal to or greater than the set illumination and the lighting device 36 becomes brighter, the controller 13 may turn off the lighting device 36.

The sensor may be an inside temperature sensor 153. The controller 13 may be connected to the inside temperature sensor 153. The inside temperature sensor 153 may detect a temperature inside the refrigerator and may transfer the detected temperature to the controller 13, and the controller 13 may cause the light source 362 to glow with set color according to the temperature inside the refrigerator and may intuitively display the temperature and state inside the refrigerator through front color of the door 20.

The lighting device 36 may be adjusted in brightness. That is, according to an operation state of the refrigerator 1, the controller 13 may adjust the operation state of the refrigerator 1 by changing brightness of the lighting device 36.

The lighting device 36 may be turned off at a time set by a timer 16. That is, the lighting device 36 may be turned on according to a time when the user is mainly active and may be maintained off outside the set time range.

Irrespective of an operation state of the refrigerator 1, the brightness and color of the front surface of the door 20 may be adjusted only according to user settings.

The operation state of the lighting device operated by the controller is now described. As shown in FIG. 8, when the lighting device 36 is turned on according to an instruction of the controller 13, light emitted from the light source 362 may be directed toward the bottom surface 333 of the light guide plate 33 and then guided along the light guide plate 33.

In this case, the light guided by the light guide plate 33 may pass through the light emission surface and be diffused while passing through the front surface portion 321, and then, may pass through the front plate 31 and be transmitted to the outside. Thus, the entire front plate 31 may brightly glow, and the front surface of the door 20 may glow with a set brightness or color.

The lighting device 36 may be turned on to cause the front surface of the door 20 to glow brightly, and the front surface of the door 20 may glow with set color by light emitted from the plurality of light sources 362. In this case, the front color of the door 20 may be different color or brightness from in the state in which the lighting device 36 is turned off.

That is, a color of the front surface of the door 20 may be seen as a color of the front plate 31, and the texture and pattern disposed on the front plate 31 may be seen. In this case, the color of the front plate 31 may be color with a brightness greater than 0 and may be formed in a color other than black. The color of the front surface of the door 20 in the state in which the lighting device 36 is turned may also be referred to as a first color.

Thus, the front surface of the door 20 may be seen with color of the front plate 31, and in this case, components inside the panel assembly 30 may be seen through the front plate 31 and may not be seen to the outside by the color of the front plate 31.

In this state, the lighting device 36 may be turned on, and when the lighting device 36 is turned on, the front surface of the door 20 may glow with color set by the controller 13.

The controller 13 may control the front surface of the door 20 to glow with a second color different from the first color, and the lighting device 36 may cause the light source 362 to glow with the second color according to the control of the controller 13.

When the light source 362 glows with the second color, light of the second color may be transmitted through the front surface of the front plate 31 by light reflected by the light guide plate 33, and the front surface of the door 20, that is, the outer appearance of the front surface of the refrigerator 1 may have the second color.

In the state in which the outer appearance of the front surface of the refrigerator 1 glows with the second color, when the controller 13 controls change in color of the front surface of the refrigerator 1, and the front surface of the door 20 may glow with color that is reset by the controller 13.

The controller 13 may control the front surface of the door 20 to glow with a third color different from the first color and the second color, and the lighting device 36 may cause the light source 362 to glow with the third color according to the control of the controller 13.

When the light source 362 glows with the third color, light with the third color may be transmitted through the front surface of the front plate 31 by light reflected by the light guide plate 33, and the front appearance of the front surface of the door 20, that is, front appearance of the refrigerator 1 may have the third color.

Some of the plurality of doors 20 forming the front appearance of the refrigerator 1 may emit light or the plurality of doors 20 may independently emit light to form the front appearance of the refrigerator 1 with set color.

The refrigerator 1 may be operated to cause some doors 20 of a plurality of doors to glow or glow with specific color. That is, all the lighting devices 36 included in the doors 20 may not be operated, but instead, only some of all the doors 20 may glow. For example, any one door 201a of the refrigerating compartment door 201 may glow.

As necessary, the left refrigerating compartment door 201a and the right refrigerating compartment door 201b may glow with different colors. At least two of the doors 20 may be sequentially changed in color and at least two of the doors 20 may be sequentially turned on or off.

In this case, the lighting device 36 included in the panel assembly 30 may be controlled by the controller 13 according to the aforementioned various conditions.

The refrigerating compartment door or the freezing compartment door among the doors may be controlled to glow with different colors.

The controller 13 may control the lighting device 36 to cause one pair of the refrigerating compartment doors 201 to be seen with the first color. The controller 13 may control the lighting device 36 to cause one pair of the refrigerating compartment doors 201 to be seen with the second color.

That is, the refrigerating compartment door 201 and the freezing compartment door 202 may be distinguished therebetween with colors, and according to a temperature change inside the refrigerator, the colors of the refrigerating compartment door 201 and the freezing compartment door 202 may also be changed.

Thus, through the front color of the door 20, the user may intuitively recognize an operation state of each storage space as well as may distinguish between the refrigeration compartment and the freezing compartment.

FIG. 10 is a perspective view of a refrigerator door according to another embodiment of the present disclosure. FIG. 11 is a cutaway cross-sectional view taken along line 11-11 of FIG. 10. FIG. 12 is a front view of a panel assembly according to another embodiment of the present disclosure, and FIG. 13 is a cross-sectional view taken along line 13-13 of FIG. 12.

In this embodiment, a basic structure of the panel assembly is the same as or similar to that of the previous embodiment, but there is a difference in structure of the door on which the panel assembly is installed. Thus, only characterized portions of the current embodiment will be principally described below, and descriptions of the same portion as that of the third embodiment will be quoted by the same reference numeral according to the foregoing embodiment.

Referring to FIGS. 1 and 10 to 11, a refrigerator door 60 according to this embodiment may include a main door 70 and a sub door 80 rotatable with respect to the main door 70.

The main door 70 may have a storage space of a cabinet 10. The main door 70 may include a main door opening 702. The sub door 80 may open and close the main door opening 702.

The sub door 80 may include a door body 81 defining the overall shape of the sub door 80 and a panel assembly 82 defining an outer appearance of a front surface of the door sub 80.

The door body 81 includes a rear body 813, a front body 811 coupled to the rear body 813, and a glass assembly 83 surrounded by the rear body 811 and the front body 813.

The glass assembly 83 may include a front panel 831 and one or more insulating panels 832 and 833 spaced apart from the front panel 831. The light irradiated from the lighting unit 19a, which will be described later, may pass through the glass assembly 83.

The one or more insulating panels 832 and 833 may include a first insulating panel 832 and a second insulating panel 833. The first insulating panel 832 may be disposed between the front panel 831 and the second insulating panel 833.

The front panel 831 and the first insulating panel 832, and the first insulating panel 832 and the second insulating panel 833 may be spaced apart from each other by spacers 834. When the sub door 80 closes the main door opening 702, the glass assembly 83 may be aligned with the main door opening 702.

The panel assembly 82 may be mounted on the door body 81 in front of the glass assembly 83. A rear surface of the panel assembly 82 may be in contact with the front panel 831. The light guide plate 33 may be spaced apart from the front panel 831.

The back cover 39a of the panel assembly 82 may define an insulating space that is a space, in which an insulator is disposed, together with the rear body 813, the front body 811, and the glass assembly 83. For example, a foaming liquid is filled in the insulating space and cured to form the insulator. Thus, a portion of the insulator may be in contact with the back cover 39a.

The panel assembly 81 may include a front plate 31, a diffusion member 32, a light guide plate 33, and a back cover 39a.

The front plate 31 may include a first portion 312a, through which light transmitted through the glass assembly 83 is transmitted, and a second portion 312b which is disposed outside the first portion 312a and through which light emitted from the lighting device 36 is transmitted.

That is, in this embodiment, the light emitted from the lighting device 36 passes through the second part 312b after being diffused by the diffusion member 32, and the light emitted from the lighting unit 19a provided in the main door 70 or the cabinet 10 may pass through the first portion 312a via the glass assembly 83.

The diffusion member 32 may include a front surface portion 321. The front surface portion 321 may include an opening 321b corresponding to the first portion 312a. The opening 321b may be defined to face the glass assembly 83. Thus, the light passing through the glass assembly 83 may pass through the first portion 312a after passing through the opening 321b of the front surface portion 321. That is, the light passing through the glass assembly 83 may directly pass through the first portion 312a without being diffused by the diffusion member 32.

The diffusion member 32 includes the extension portions described in the previous embodiment, and a detailed description will be omitted in this embodiment.

A pattern for reflecting light emitted along the light guide plate 33 forward may be disposed on the light guide plate 33. The pattern disposed on the light guide plate 33 will be described later with reference to the drawings.

The panel assembly 82 according to this embodiment includes a lighting device 36, a substrate supporter 37, and a rear supporter 34, which have the same shape and arrangement structure as those according to the previous embodiment. Therefore, a detailed description will be omitted below.

The back cover 39a according to this embodiment may include an opening 398 corresponding to the glass assembly 83 or the first portion 312a.

The opening 398 of the back cover 39a allows the light passing through the glass assembly 83 to pass therethrough.

Unlike the diffusion member 32 and the back cover 39a, which include openings 321b and 398, respectively, the light guide plate 33 may not include the openings. That is, the light guide plate 33 may include a part facing each of the openings 321b and 398 to cover each of the openings 321b and 398.

FIG. 14 is a view illustrating a pattern portion of the light guide plate according to another embodiment of the present disclosure.

Referring to FIGS. 10 and 10 to 14, since the light source 362 is disposed below the light guide plate 33 according to this embodiment, a bottom surface 333 of the light guide plate 33 may serve as a light entrance surface.

Since the front plate 31 is disposed in front of the light guide plate 33, a front surface 331 of the light guide plate 33 serves as a light entrance surface.

A pattern may be provided on the light emission surface of the light guide plate 33. The pattern may be an optical pattern. The pattern may be designed so that the brightness increases on the light emission surface of the light guide plate 33, and the brightness is maintained within a predetermined range as a whole. A density and/or shape of the pattern may be different for each position on the entire light emission surface.

However, according to the shape of the pattern, the pattern may be provided on an opposite surface of the light emission surface. Thus, a surface on which the pattern is provided may be referred to as a pattern surface. Hereinafter, a case in which the pattern is provided on the light emission surface will be described as an example.

A pattern P is briefly indicated in a circular shape for convenience of description, and the shape of the pattern may vary and may be defined by intaglio or embossing, or a combination thereof.

The light guide plate 33 may include a first part 337a corresponding to the first portion 312a of the front plate 31 and a second part 337b corresponding to the second portion 312b of the front plate 31.

The first part 337a may be disposed to face the glass assembly 83. Substantially, the first part 337a may be aligned with the opening 321b of the diffusion member 32 and the opening 398 of the back cover 39a.

A pattern may not be disposed on the first part 337a so that the light irradiated from the lighting device 36 is not emitted. When the pattern is not disposed on the first part 337a, the light irradiated from the lighting device 36 may not be emitted to the front surface of the first part 337a even if passing through the first part 337a.

On the other hand, a pattern is disposed on the second part 337b to emit light. Thus, in this embodiment, the second part 337b serves as a light emission surface.

A pattern is disposed on the second part 337b and is not disposed on the first part 337a. Thus, brightness of light when the light passes through the front plate 31 after passing through a boundary 339 between the first part 337a and the second part 337b may be less than that when the light passes through the front plate 31 after passing through the remaining portions except for the boundary 339.

In this case, the brightness of the portion corresponding to the boundary 339 of the front plate 31, for example, the boundary between the first portion 312a and the second portion 312b may be less than that of the remaining portions, and thus, the overall brightness may be not uniform.

In this embodiment, to improve the uniformity in brightness of the second portion 312b in the front plate 31, in the light guide plate 33, a pattern density at the boundary 330 with respect to the first part 337a in the second part 337b may be different from that of the remaining portion in the second part 337b.

In this embodiment, the high density of the pattern P may mean that an amount of emitted light is large. When the density of the pattern P is low, it means that the amount of emitted light is small.

In addition, when the density of the patterns P is high, an interval between the patterns P is small, and when the density of the patterns P is low, an interval between the patterns P is large.

The boundary 339 on the light emission surface of the light guide plate 33 may include a first pattern portion 339a. A density of at least a portion of the pattern of the first pattern portion 339a may be greater than that of the pattern of at least a portion of the remaining portions except for the boundary 339.

In this embodiment, an amount of emitted light at the boundary 339 on the light emission surface of the light guide plate 33 may be the largest.

Since the light source 362 is disposed below the light guide plate 33, when the densities of the patterns on the light emission surface are the same, the amount of emitted light may not be uniform throughout the light emission surface of the light guide plate 33.

For example, when a height of the light guide plate 33 is divided into trisections, or when the light guide plate 33 is divided into trisections in the vertical direction, the light guide plate 33 may include a first section 338a, a second section 338b, and a third section 338c from the lower side.

The first section 338a may include a second pattern portion 338a1, and the second section 338b may include a third pattern portion 338b1. The third section 338c may include a fourth pattern portion 338c1.

In this embodiment, a density of a pattern of the third pattern portion 338b1 is greater than that of a pattern of the second pattern portion 338a1, and a density of a pattern of the fourth pattern portion 338c1 is greater than that of the pattern of the third pattern portion 338b1 so that the uniformity of the amount of light emitted from the light emission surface of the light guide plate 33 is improved.

In another aspect, an interval between the light source 362 and the pattern in the section disposed far from the light source 362 is less than that between the pattern in the section disposed close to the light source 362.

The third second 338c and the second section 338b may be far from the light source 362 when compared to the first section 338a, but the density of the pattern may be designed so that the amount of light emitted is large to improve the uniformity of the brightness.

Alternatively, in another embodiment, it is also possible to divide the height of the light guide plate 33 into quadrisections or more in addition to the trisections so that the density of the pattern is different for each section.

According to this embodiment, since the pattern is designed in consideration of the distance from the light source 362, the uniformity of the brightness as a whole in the door may be improved.

To secure the uniformity of the brightness, the shape of the pattern may be different in each section of the light guide plate 33 described above and the boundary, but the shape of the pattern may be changed to have the same effect as varying the density while providing the pattern the same.

Alternatively, the shape of the pattern of the first pattern portion is different from that of the pattern of each of the remaining pattern portions. Here, it is also possible to be designed so that the shape of the pattern is the same for each section divided in the portion except for the boundary 339, and the density of the pattern is different.

FIG. 15 is a block diagram illustrating a flow of a control signal in a refrigerator according to another embodiment of the present disclosure.

In case of a refrigerator according to this embodiment, in addition to the configuration described in the block diagram of FIG. 7, the refrigerator may further include a lighting unit 19a and a knock detection sensor 19b.

The lighting unit 19a may be provided in a main door 70 or a cabinet 10. The knock detection sensor 19b may be provided in, for example, a sub door 80. The knock detection sensor 19b may detect a knock input applied to a front plate 31. The knock detection sensor 19b may include, for example, at least one of a microphone for detecting sound waves, a vibration sensor, and an acceleration sensor.

As described above, when an ON command of a lighting device 36 is input, light emitted from a light source 362 moves along a light guide plate 33, and then the light is transmitted through a second portion 312*b* of the front plate 31 after passing a diffusion member 32 after emitted from a second part 338*b* of the light guide plate 33.

On the other hand, when a user's knock input is detected by the knock detection sensor 19*b*, the lighting unit 19*a* is turned on. When the lighting unit 19*a* is turned on, the light irradiated from the lighting unit 19*a* is transmitted through the first portion 312*a* of the front plate 31 after passing through a glass assembly 83, an opening 398 of a back cover 39*a*, and a first part 338*a* of the light guide plate 33, and the opening 321*b* of the diffusion member 32.

When the lighting unit 19*a* is turned on, and the light passes through the first portion 312*a* of the front plate 31, in a state in which the sub door 80 and the main door 70 are closed, the inside of the storage space may be checked, or foods stored in a receiving portion of the main door 70 may be checked.

In the above embodiment, the ON command of the lighting unit 19*a* may be input by various types of sensors other than the knock detection sensor 19*b*, and the ON command of the lighting unit 19*a* may be input by an operation of a user's manipulator.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A home appliance comprising:
   a cabinet having a space; and
   a door configured to open and close the space, the door including:
      a door body provided with an insulation material therein, the door body having a front surface;
      a lighting device configured to emit light;
      a front plate disposed on the front surface of the door body, the front plate having:
         a first portion; and
         a second portion through which the light emitted from the lighting device is transmittable, the second portion being located outwardly of the first portion,
      wherein, when the light emitted from the lighting device passes through the second portion, the second portion of the front plate glows with a specific color by the light emitted from the lighting device.

2. The home appliance of claim 1, wherein the specific color varies by varying a color of the light emitted from the lighting device.

3. The home appliance of claim 2, wherein the color of the light emitted from the lighting device varies by varying one or more values of an R value, a G value, and a B value of the emitted light from the lighting device.

4. The home appliance of claim 1, further comprising a light guide plate located behind the front plate.

5. The home appliance of claim 4, wherein the light guide plate includes a pattern configured to allow the light emitted by the lighting device to be transmitted therethrough, the pattern being located on an area of the light guide plate that faces the second portion.

6. The home appliance of claim 5, wherein the area of the light guide plate includes:
   a first area disposed close to a boundary between the first portion and the second portion; and
   a second area disposed farther from the boundary than the first area,
   wherein an amount of light emitted by the first area is greater than an amount of light emitted by the second area.

7. The home appliance of claim 5, wherein the area of the light guide plate includes:
   a first area disposed close to a boundary between the first portion and the second portion; and
   a second area disposed farther from the boundary than the first area, and
   wherein the pattern includes:
      a first pattern on the first area; and
      a second pattern on the second area, a density of the second pattern being less than a density of the first pattern.

8. The home appliance of claim 5, wherein the area of the light guide plate includes:
   a first area disposed close to a boundary between the first portion and the second portion; and
   a second area disposed farther from the boundary than the first area, and
   wherein the pattern includes:
      a first pattern on the first area; and
      a second pattern on the second area, a shape of the second pattern being different from a shape of the first pattern.

9. The home appliance of claim 5, wherein the light guide plate comprises:
   a first section located close to the lighting device; and
   a second section disposed farther from the lighting device than the first section,
   wherein the pattern includes:
      a first pattern on the first section; and
      a second pattern on the second section, and
   wherein a density of the second pattern is greater than a density of the first pattern.

10. The home appliance of claim 9, wherein the light guide plate includes:
    a first section located close to the lighting device; and
    a second section located farther from the lighting device than the first section, and
    wherein an amount of light emitted from the second section is greater than an amount of light emitted from the first section.

11. The home appliance of claim 5, wherein the light guide plate includes:
    a first part corresponding to the first portion of the front plate; and
    a second part through which the light emitted from the lighting device is transmittable, the second part being located outwardly of the first part, and
    wherein the pattern is provided on only the second part such that the light emitted from the lighting device passes through the second part but does not pass through the first part.

12. The home appliance of claim 4, further comprising a diffusion member including:

a front portion configured to diffuse the light passing through the light guide plate, the front portion being located between the front plate and the light guide plate, and an extension portion extending along a perimeter of the front portion, the extension portion covering at least a portion of a perimeter of the light guide plate.

13. The home appliance of claim 12, wherein the extension portion includes:

an upper extension portion extending from an upper end of a rear surface of the front portion; and a lower extension portion extending from a lower end of the rear surface of the front portion, and wherein the light guide plate is located between the upper extension portion and the lower extension portion.

14. The home appliance of claim 13, wherein the extension portion further includes:

a left side portion extending from a left end of the front portion; and a right side portion extending from a right end of the front portion, and wherein the light guide plate is disposed between the left side portion and the right side portion.

15. The home appliance of claim 13, wherein the diffusion member further includes:

a light guide plate support located above the lower extension portion to support a bottom surface of the light guide plate; and a receiving groove located between the light guide plate support and the lower extension portion to accommodate the lighting device therein.

16. The home appliance of claim 13, wherein the light guide plate contacts a rear surface of the front portion of the diffusion member.

17. The home appliance of claim 12, wherein the door further comprises a back cover configured to cover a rear side of the light guide plate, the back cover including a bent portion in contact with the extension portion.

18. The home appliance of claim 1, further comprising a lighting unit configured to emit light, and wherein the light emitted from the lighting unit is directed to the first portion of the front plate.

19. A home appliance comprising:

a cabinet having a space;

a first door configured to open and close a first portion of the space, the first door including:

a first lighting device configured to emit a first light;

a first front plate defining a front surface of the first door, the first front plate having:

a first portion; and a second portion through which the first light emitted from the first lighting device is transmittable, the second portion being located outwardly of the first portion; and a second door configured to open and close a second portion of the space, the second door including:

a second lighting device configured to emit a second light;

a second front plate defining a front surface of the second door, the second light emitted by the second lighting device being transmittable through the second front plate, wherein, when the first light emitted from the first lighting device passes through the second portion of the first front plate, the second portion of the first front plate glows with a first color by the first light emitted from the first lighting device, and wherein, when the second light emitted from the second lighting device passes through the second front plate, the second front plate glows with a second color by the second light emitted from the second lighting device.

20. The home appliance of claim 19, wherein the first color of the light glowing at the second portion of the first front plate is the same as the second color of the light glowing at the second front plate.

\* \* \* \* \*